United States Patent Office 2,731,447
Patented Jan. 17, 1956

2,731,447

NOVEL POLYIMIDES

William F. Gresham and Marcus A. Naylor, Jr., Wilmington, Del., assignors to E. I. du Pont de Nemours and Company, Wilmington, Del., a corporation of Delaware No Drawing. Application June 11, 1954, Serial No. 436,249

4 Claims. (Cl. 260—78)

This invention relates to novel polyimide compositions especially those obtained by reaction between diaminoalkanes and 2,2-bis-(3,4-dicarboxyphenyl) propane or the dianhydride or esters thereof.

Polyimide linear polymers have been disclosed heretofore (cf. British Patent 570,858; U. S. patent application S. N. 387,038, filed October 19, 1953, and now Patent No. 2,710,853). Heretofore the most outstanding of these linear polyimides have been prepared by reaction of a diaminoalkane with pyromellitic acid, the dianhydride or esters thereof.

An object of this invention is to provide a new class of linear polyimide polymers derived from tetracarboxylic acids of the formula

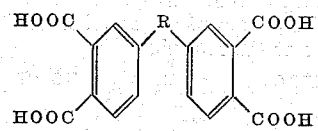

(wherein —R— is —O— or a bivalent aliphatic saturated hydrocarbon radical) or imide-forming derivatives of said acids. The novel polyimides of this invention are in general obtained by reaction between diaminoalkanes and acids of the formula hereinabove set forth or esters or dianhydrides of said acids. More particularly the preferred linear polyimides of this invention are those which are obtained by reaction between diaminoalkanes having at least 4 carbon atoms separating primary amino groups and the above-formulated acid, namely, 2,2-bis-(3,4-dicarboxyphenyl) propane, or the dianhydride or esters thereof. The preparation of 2,2-bis-(3,4-dicarboxyphenyl) propane, its esters and dianhydride is disclosed in copending application Serial No. 436,248, filed June 11, 1954. One of the methods for preparing 2,2-bis-(3,4-dicarboxyphenyl) propane (hereinafter called PAP) is by reaction between o-xylene and 2,2-dichloropropane in the presence of aluminum chloride followed by nitric acid oxidation of 2,2-bis-(3,4-dimethylphenyl)-propane thus obtained. A suitable procedure is described below.

Pure o-xylene (318 grams, 3 moles) was cooled to slightly below 0° C. and 26 grams aluminum chloride was added. While this mixture was stirred, a mixture of 106 grams (1 mole) of o-xylene and 113 grams (1 mole) of 2,2-dichloropropane was added over a one to two hour period. The temperature was maintained at about —5° C. during this addition and for two to four hours afterward. The reaction mixture was poured into ice and allowed to come to room temperature. The organic layer was separated and washed several times with aqueous sodium hydroxide solution and several times with water. This material was dried with anhydrous magnesium sulfate and was distilled through a 24 inch Vigreaux column. After the excess xylene was removed, 126–146 grams of 2,2-bis-(3,4-dimethylphenyl) propane was collected at 140° C./1 mm. (M. P. 54.5 to 55.5° C., yield 50 to 58%). A sample of this material was recrystallized from methanol and dried at reduced pressure.

*Analysis.*—Calculated for $C_{19}H_{24}$: C, 90.4%; H, 9.58%. Found: C, 90.4, 90.5%; H, 9.8, 9.7%.

The hydrocarbon, 2,2-bis-(3,4-dimethylphenyl) propane (9.80 grams, 0.0389 mole), was oxidized in two shaker tubes with three per cent nitric acid (14 grams of 70% nitric acid and 320 ml. of water, 0.1556 mole $HNO_3$) at 250° C. for 30 minutes. The tubes were washed with five per cent sodium hydroxide solution. The basic solution was filtered and it was heated to reflux. Potassium permanganate (20.5 grams; theoretically required 25 grams) was added over a two hour period to complete the oxidation, and the solution was refluxed one hour longer. The excess permanganate was destroyed with alcohol, and the manganese dioxide was removed. The filtrate was acidified with hydrochloric acid and evaporated to dryness. This solid residue was extracted with acetone, and the acetone solution in turn was evaporated. The remaining viscous liquid was treated with xylene as above described to obtain about 2 grams of the crude 2,2-bis-(3,4-dicarboxyphenyl) propane dianhydride. Samples obtained in this manner were recrystallized from chloroform and toluene. The melting point was 185–186° C.

The acids, esters, and dianhydrides of the formula hereinabove described, wherein —R— is —O— have not been described heretofore in the chemical literature. A suitable method of preparation is by reaction between 3,4-dimethylphenol and 4-bromo-o-xylene in the presence of potassium hydroxide to produce bis-(3,4-dimethylphenyl) ether which upon oxidation with potassium permanganate in alkaline solution gives rise to the formation of bis-(3,4-dicarboxyphenyl) ether in the form of a salt. The details of these procedures are given below.

A mixture of 75 grams (0.6 mole) of 3,4-dimethylphenol and 19.6 grams (0.35 mole) of potassium hydroxide was heated and stirred together until water ceased to distill (about 160° C. final temperature). Nitrogen was passed through the flask to prevent oxidation of the reactants. About 1 gram of copper powder and 55.5 grams (0.3 mole) of 4-bromo-o-xylene was added to the mixture and it was heated for three hours, gradually raising the temperature to about 245° C. After the mixture had cooled it was poured into 300 ml. of water, and the organic material was extracted with an ether and benzene mixture. Excess phenols were removed by washing the ether-benzene solution with 10% sodium hydroxide solution. After the solvents were distilled at atmospheric pressure, a fraction was collected at 140° C./3 mm. Refractionation through a 24 inch spinning band column produced 45 grams of bis-(3,4-dimethylphenyl) ether (boiling point, 119° C./1 mm.; melting point 55–57° C.; 78% yield).

Thirty-six grams (0.159 mole) of bis-(3,4-dimethylphenyl) ether was oxidized by refluxing in 800 ml. of pyridine and slowly adding 400 ml. of water with 100 grams (0.633 mole) of potassium permanganate. The oxidation was completed with 135 grams (0.854 mole) of potassium permanganate in aqueous alkali (aqueous sodium hydroxide solution of 7% concentration) at boiling temperature for about 1 hour. The excess permanganate was destroyed with ethanol and the manganese dioxide was collected on a filter, the precipitate was washed with water and the filtrates were combined, acidified, and evaporated to dryness. The solid residue was extracted with hot acetone and the acetone solution was evaporated to dryness. The resulting residue which contained the tetracarboxylic acid was recrystallized from water and the neutralization equivalent was found to be 86.8 (theoretical value, for bis-(3,4-dicarboxyphenyl ether) 86.5).

The preparation of the linear polyimides of this invention is illustrated by means of the following examples.

*Example 1.*—The diethyl ester of 2,2-bis-(3,4-dicarboxyphenyl) propane was obtained by adding a few drops of pyridine to an ethanol suspension of the dianhydride to facilitate rapid esterification, whereby a solution containing diester was produced. To this solution was added one molar equivalent of diamine, after which the solvent was removed by heating under diminished pressure, allowing the temperature to reach 138° C. The polymerization was finally completed by heating this prepolymer in stages, under diminished pressure, until a final temperature of 325° C. was reached. Products made in this manner exhibited the following properties (the diamines being tetramethylenediamine and hexamethylenediamine respectively).

*Physical properties of polyimides derived from PAP dianhydride and diamines*

| Property | When Diamine Component is Tetramethylenediamine | When Diamine Component is Hexamethylenediamine |
|---|---|---|
| Inherent viscosity (½% in m-cresol) | 1.34 | 1.67 |
| Stiffness, p. s. i. (10 mil film): | | |
| 23° C | 387,000 | 293,000 |
| 50° C | 332,000 | 263,000 |
| 75° C | 323,000 | |
| 100° C | 297,000 | 218,000 |
| Heat distortion temperature °C | 177 | |
| Dielectric constant (1,000 cycles) | 3.48 | 3.19 |
| Power factor (1,000 cycles) | 0.0012 | 0.0018 |
| Tensile strength, p. s. i. | 14,100 | |
| Elongation percent | 10 | |
| Creep rate, mils/in./hr., 100 hrs.: | | |
| 2,000 p. s. i. stress | 1.85×10⁻³ | |
| 3,000 p. s. i. stress | 2.8×10⁻³ | |
| Tukon hardness, kg./mm.²: | | |
| Long diagonal | 26.4 | |
| Short diagonal | 29.4 | |
| Percent Recovery | 9.96 | |
| Water absorption, 24 hours percent | 1.61 | |
| Equilibrium water absorption do | 2.04 | |
| Dimensional change | None | |

The dianhydride of 2,2-bis-(3,4-carboxyphenyl) propane can be converted directly to polyimides by reaction with diamines, including bis-(3-aminopropyl) ether, an amine of the formula

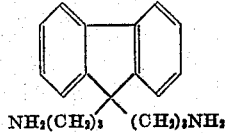

NH₂(CH₂)₃  (CH₂)₃NH₂ and especially those diaminoalkanes which have at least four carbon atoms in the chain separating the primary amino groups. Instead of the anhydride, the parent acid or esters thereof may be employed. The diamines which are most suitable include tetramethylenediamine, pentamethylenediamine, hexamethylenediamine, and other diaminoalkanes having from 4 to 12 carbon atoms or more, especially those having at least 4 carbon atoms separating the amino groups. The polymerization of trimethylenediamine with the dianhydride of 2,2-bis-(3,4-dicarboxyphenyl) propane gave a relatively low molecular weight product (inherent viscosity 0.27, as measured in ½% solution in m-cresol).

*Example 2.*—To 3.2153 parts of bis(3,4-dicarboxyphenyl) ether which had been dissolved in ethanol there was added 1.2026 parts of hexamethylenediamine. The ethanol was removed therefrom by heating at 110° C. for one and one-half hours and the residue was polymerized by heating under nitrogen at 138° C. for one hours, 197° C. for one hour, 282° C. for one hour and at 325° C. for one-half hour. The resultant brown polymer, hexamethylene bis(3,4-dicarboxyphenyl) ether polyimide fused at the highest temperature.

The polyimides obtained by the use of the polyimide intermediates of this invention are useful in applications requiring a low dielectric constant and low power factor together with the low rate of creep, low vibrational energy absorption, low water absorption, and good oxidative and thermal stability.

We claim:

1. A linear polyimide in which the diamine component is a diaminoalkane having at least four carbon atoms separating primary amino groups and in which the other imide-forming component is a member of the class consisting of acids of the formula

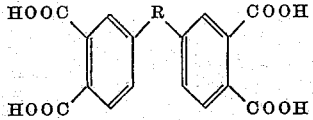

wherein —R— is a member of the class consisting of —O— and bivalent 2,2-propane radicals.

2. Tetramethylene 2,2-bis-(3,4-dicarboxyphenyl) propane polyimide.

3. Hexamethylene 2,2-bis-(3,4-dicarboxyphenyl) propane polyimide.

4. Hexamethylene bis(3,4-dicarboxyphenyl) ether polyimide.

No references cited.